United States Patent [19]

Pausch

[11] 4,082,523
[45] Apr. 4, 1978

[54] FILTER BAG CLEANING APPARATUS

[76] Inventor: Josef Pausch, 2016 Dwight La., Minnetonka, Minn. 55343

[21] Appl. No.: 765,783

[22] Filed: Feb. 4, 1977

[51] Int. Cl.² .............................................. B01D 46/04
[52] U.S. Cl. ......................................... 55/293; 55/302
[58] Field of Search ............. 55/293, 302, 301, 341 R; 210/393

[56] References Cited

U.S. PATENT DOCUMENTS

| 3,095,289 | 6/1963 | Egan | 55/293 |
| 3,525,199 | 8/1970 | Crommelin, Jr. et al. | 55/302 |
| 3,653,188 | 4/1972 | Fisher et al. | 55/302 |
| 3,837,150 | 9/1974 | Kubiak | 55/293 |
| 3,864,108 | 2/1945 | Brookman | 55/302 |

FOREIGN PATENT DOCUMENTS 2,146,746  3/1973  Germany ............................. 55/302

*Primary Examiner*—Frank W. Lutter
*Assistant Examiner*—David L. Lacey

[57] ABSTRACT

In a system for dust collection and filtering of particulate matter from an air stream, wherein dustladen air is passed through a plurality of bags constructed from suitable effective filtering material so as to collect dust and particulate matter along an internal confined surface of the bag while permitting cleaned air to pass through the bag material, an apparatus for periodically generating an air shock wave which propagates along the bag surface and physically vibrates the bag material. The apparatus includes a plurality of air jets positioned adjacent a bag end in non-axial alignment with the bag, in combination with a circumferential deflection collar surrounding the bag end so as to receive the initial air shock wave and deflect the pressure forces along the circumferential length of the bag.

7 Claims, 4 Drawing Figures

FILTER BAG CLEANING APPARATUS

BACKGROUND OF THE INVENTION

This invention relates to an apparatus for cleaning bag filters, particularly filters of the type utilized in industrial systems for dust collection wherein a system may comprise a large housing which may have enclosed therein a plurality of elongated tubular bags, and a ducting system conveying dust-laden air into the housing and clean air from the housing with the assistance of a blower system mounted somewhere in the ducting system.

Industrial filtering systems are used for removing particulate matter from air and other gaseous mixtures for recycling in industrial control processes, and also for cleaning the environmental air supplied to work stations in an industrial plant. In either event it is frequently necessary for such systems to handle tremendous volumes of air flow continuously, and in a manner in which the filtering components can be periodically cleaned so as to maintain the air flow efficiency over long periods of time. Without special filter cleaning mechanisms any filtering system will eventually accumulate such quantities of particulate matter so as to impede further flow of air therethrough, thereby reducing the delivery rate of air. Typically such cleaning systems are serially inserted into a ducting system so that all air passes through the filter apparatus and wherein the particulate matter is trapped within the apparatus and the clean air is permitted to pass through the apparatus. Since such a system is serially connected into a ducting network, means must be provided for removing the collected particulate matter from clogging the air flow passages. Large filter bag housings have been constructed to manage this problem, wherein a plurality of tubular bag members are coupled to a dirty air duct so as to force the dirty air downwardly or upwardly through the tubular bag interior, and a clean air duct is connected to the housing so as to be in air coupling arrangement with the bag exterior. A pressure differential is therefore developed across the bag surface wherein air passes through the surface while the bag material impedes the passage of the particulate matter which is to be filtered from the air flow. Bag materials are selected so as to have the desired density for the particle sizes encountered in any particular environment. As such a system operates particulate matter becomes accumulated along the inner bag surfaces, although some of the particulate matter breaks free from the bag and falls downwardly through the open bag tubular end into a collection hopper. However, a considerable amount of particulate matter does not fall free and must be physically removed by means of a mechanical or other type of bag shaking mechanism. In the prior art, mechanical shakers have physically vibrated the bag periodically in order to dislodge particulate matter so accumulated. Other prior art systems have utilized an air pressure reversal technique for periodically reversing the pressure drop across the bag surface, thereby collapsing the bags having accumulate particulate matter along their inner surface and physically and forcibly dislodging such matter in this manner. Such pressure reversal devices have required valving or gating mechanisms coupled to the delivery ducting system so as to shut off the inlet air supplied to the system and to disconnect the outlet air temporarily until a reverse pressure air supply can be injected into the bag housing.

Mechanical bag shaking systems have suffered from the obvious disadvantage of high cost and unreliability, for the driving mechanism must be of significant power capability. Typical bag filter housings in industrial applications may contain 12 - 30 filter bags, each bag having a diameter of about 8 - 12 inches and a length of from 12 - 20 feet. Therefore, a mechanical apparatus for physically shaking the bags in such a system requires a power source of significant magnitude. The cost of providing this power source, together with the mechanical difficulties and unreliability of the various mechanical couplings makes such a system undesirable in most industrial applications.

The air pressure reversal type of bag cleaning system is a more preferred approach to the problem, for it operates smoothly by delivering a reverse pressure blast into the housing which is of sufficient magnitude so as to collapse all of the bags in the housing. However, this approach requires a considerable volume of reverse air flow to be held in reverse for the cleaning blast to be effective, and also requires gating mechanisms for interrupting the normal flow paths through the ducting system. This system is somewhat destructive of bags, particularly bags which may have accumulated an excessive amount of particulate matter and are therefore unable to relieve the pressure stresses which are suddenly imposed upon them. The collapse of a bag which is nearly clogged with particulate matter may be so extreme as to rupture the bag and require replacement. To the extent that some bags in a filter housing having accumulated a greater or lesser layering of particulate matter they will be effective to a greater or lesser degree by the reverse air pressure and will be physically stressed to a greater or lesser degree. Thus, while some bags in the housing may be shaken very little others may collapse to the point of bag rupture and thereby disable the effectiveness of the entire system. These problems have caused users of the reverse pressure bag cleaning technique to place supporting grids internally of the bag to prevent bag collapse beyond a predetermined distance, and have required such systems to limit the maximum length of bag which may be used in any particular application. Such systems have also found it necessary to compartmentalize a series of shorter bag lengths into a plurality of zones for cleaning in order to control the maximum degree of bag collapse which may exist in any one zone. While all of these solutions have proved workable, they add to the cost and complexity of a filter cleaning system and are therefore undesirable.

SUMMARY OF THE INVENTION

The present invention eliminates the disadvantages of the prior art by utilizing a pressure shock wave which is directionally established through the use of air jet nozzles, in combination with circumferential bag deflection collars placed in the immediate air jet flow path so as to deflect initial shock waves away from direct bag contact. The air shock waves generated by the invention are deflected downwardly along the bag length to cause a generally downwardly moving shock front which vibrates the bag surface without collapsing the bag completely as is found in prior art reverse pressure systems. The invention comprises a high pressure air pipe running through the filter bag housing proximate the center of the housing, the high pressure air pipe having air jets positioned intermediate respective filter bag ends, and a circumferential bag collar surrounding the bags at their ends so as to receive the initial air jet blast and prevent the blast from directly contacting the bag ends. A single high pressure air blast into the central high pressure air pipe causes each of the air jets to emit a pressure blast which impinges upon and is deflected by the collars and is propagated downwardly along the exterior bag surface, vibrating said surface as it moves.

BRIEF DESCRIPTION OF THE DRAWINGS

A detailed description of the invention and its operation is contained herein, with reference to the appended drawings in which.

DESCRIPTION OF THE PREFERRED EMBODIMENT

Figure 1:
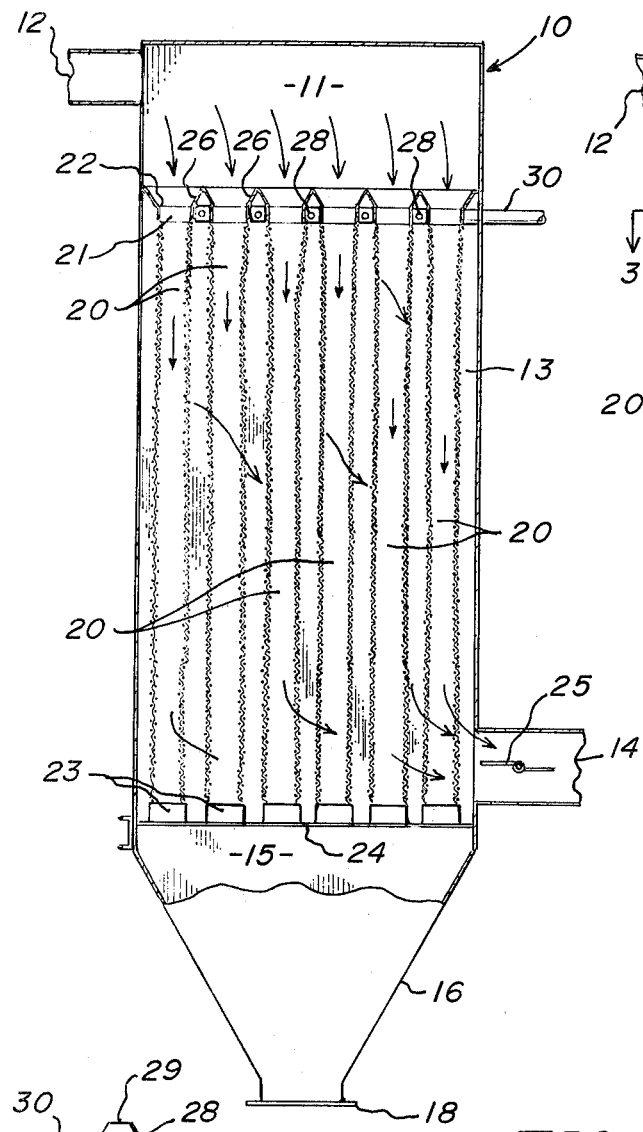
FIG. 1 illustrates a plan view, in partial cross section, of a filter bag housing.

Referring first to FIG. 1, a filter bag housing 10 is shown in partial cross section and plan view. Filter bag housing 10 has an inlet 12 for receiving gases laden with dust or other particulate matter, and an outlet 14 for delivering clean gas. A collection hopper 16 is mounted beneath filter bag housing 10 for the purpose of collecting particulate matter which has been filtered from the air which passes through the apparatus. Collection hopper 16 may have a movable gate 18 which can be opened for removing accumulations from within collection hopper 16. Alternatively, gate 18 may be replaced by a coupling to a suitable storage removal system. A collection chamber 15 is formed within hopper 16 for the purpose of accumulating particulate matter which has been filtered from the air flowing through the apparatus.

An inlet chamber 11 is located near the top of the filter bag housing 10, and in direct air communication with inlet 12. A plurality of filter bags 20 are connected so as to have their interiors in air communication with inlet chamber 11, each of the bags 20 having a top and bottom open end. The top ends of bags 20 are sealably connected to a top plate 22, and the bottom bag openings are sealably connected to a bottom plate 24. Top and bottom plates 22 and 24 have openings in alignment with the bag ends to create a communication path between chamber 11 and chamber 15. However, top and bottom plates 22 and 24 isolate chambers 11 and 15 from communication with center bag chamber 13. Center bag chamber 13 is in communication with outlet 14. A movable gate 25 is located in outlet 14, and it may be opened to permit air flow through outlet 14 as is shown in FIG. 1, or closed (see FIG. 2) to block air flow through outlet 14.

A plurality of bag retainer rings 23 are positioned along bottom plate 24 for clamping the bottom bag openings securely in sealable relationship to bottom plate 24. Similarly, a plurality of retainer collars 21 are attached to top plate 22 for connecting the top openings of bags 20 in sealable relationship to top plate 22. Retainer collars 22 cover the top bag circumferences for a predetermined axial distance for functional purposes which will be hereinafter described. Top plate 22 preferably has a plurality of conical openings 26 which are each aligned with a bag open end, and which may be sealably attached to a collar 21. The underside of each of the conical openings 26 forms a downwardly diverging circumference which terminates adjacent a collar 21, and assists in developing the directional air flow characteristics which will be hereinafter described.

A high pressure air pipe 30 projects through the side of filter bag housing 10, across the approximate center of the housing. A plurality of air jets 28 are positioned along the length of pipe 30, intermediate respective filter bags 20 and at a vertical position above the bottom edges of retainer collars 21 and below the undersurfaces of conical openings 26. Air jets 28 are directed so as to pass an air jet between respective bags 20.

Figure 2:
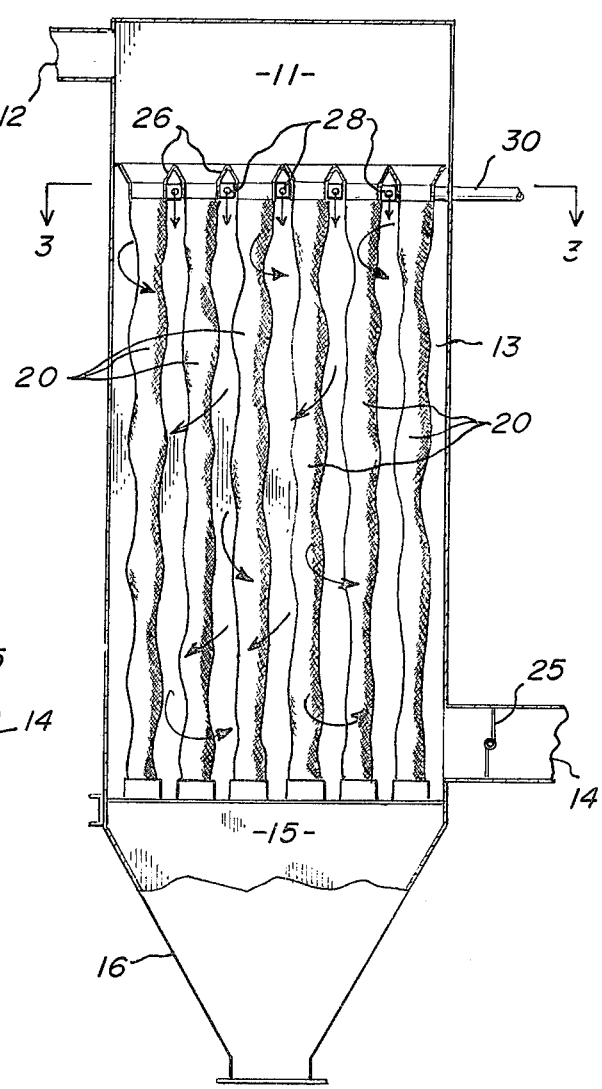
FIG. 2 illustrates the same view as FIG. 1 in a different operational mode.

FIG. 2 illustrates a similar side perspective view as FIG. 1, differing only in the illustrative operational mode. The operational mode illustrated by FIG. 2, as contrasted with the operational mode illustrated by FIG. 1, will be explained in greater detail hereafter in connection with the operation of the apparatus.

Figure 3:
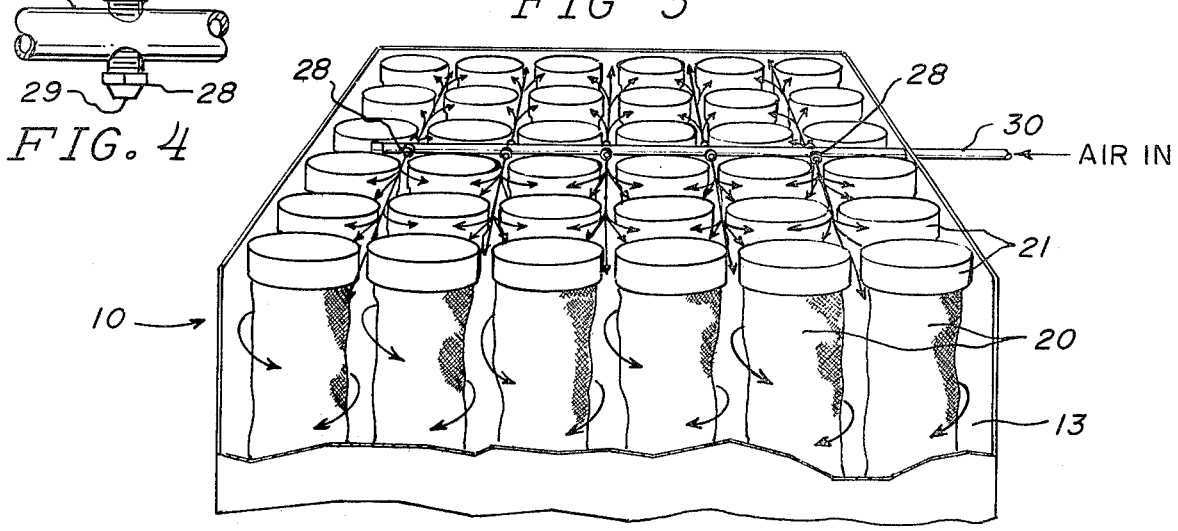
FIG. 3 illustrates an oblique side view taken along the lines 3 — 3 of FIG. 2.

FIG. 3 illustrates an isometric view taken along the lines 3 – 3 of FIG. 2. This view shows a filter bag housing having a relatively square cross sectional area, and wherein thirty-six bags 20 are symmetrically arranged throughout filter bag housing 10. This view is intended for illustrative purposes only, for any greater or lesser number of bags 20 may be used in conjunction with the present invention, and the cross sectional area of filter bag housing 10 may be other than square in shape for satisfactory operation. High pressure air pipe 30 is centrally aligned through housing 10 between rows of bags 20. Air jets 28 are positioned along pipe 30 at relative intermediate positions with respect to bags 20, and pipe 30 is placed at an elevation substantially equal to the height of retainer collars 21. In a typical embodiment bags 20 are each eight inches in diameter and retainer collars 21 are formed around the outer circumference of bags 20, extending downwardly a distance of about four inches. As hereinbefore stated, collars 21 are each rigidly attached to a top plate 22 at conical openings 26 which are not shown in FIG. 3.

Figure 4:
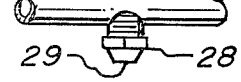
FIG. 4 illustrates an enlarged view of the air jets of the present invention.

FIG. 4 illustrates in expanded view a section of high pressure pipe 30 having two oppositely positioned air jets 28. Each air jet 28 has an orifice 29 shaped for delivering a high velocity air blast whenever pipe 30 is pressurized.

The apparatus is typically used in two operating modes. FIG. 1 illustrates the filtering mode of operation wherein dirty air passes into inlet chamber 11 via inlet 12 and downwardly through the bag interiors. As the air passes through the bags to their exteriors the particulate matter is accumulated along the inside bag surfaces and much of it drops down into collection chamber 15. Meanwhile, the cleaned air passes through outlet 14 for use as needed in the industrial or environmental operation. FIG. 2 illustrates the bag cleaning mode of operation wherein gate 25 is closed to isolate outlet 14 from bag chamber 13. A blast of high pressure air is introduced into high pressure air pipe 30 to cause a plurality of air jet blasts to become emitted through air jets 28. These air jet blasts are deflected against collars 21 and the underside of conical openings 26 and are deflected downwardly over the transverse bag surfaces. The downward air blast deflection causes the respective bag surfaces to move, thereby shaking them and physically dislodging any particulate matter which may have accumulated along the bag interiors.

In a typical embodiment it has been found that an air blast in the range of 30 – 150 pounds per square inch (p.s.i.) is adequate for creating the necessary downwardly traveling air shock wave for vibrating the bags. The air blast is typically maintained for about 1/10 second, and in the preferred embodiment at a pressure of 100 p.s.i. The air blast may be repeated four to five times over about a ten second time interval for maximum cleaning action. It has been found that under these conditions a bag surface will deflect about ± 1 inch and will undergo a violent vibratory action. This limited deflection results in the elimination of the need for internal bag supporting structures which are otherwise necessary in reverse pressure bag cleaning systems. The pressure shock wave which emits from these orifices expands at about a 15° range initially, and subsequently follows the path generally indicated by the arrows in FIGS. 2 and 3. The collars 21 which surround the outer circumference of the respective bags near their top ends protect the bags from the direct shock effects of the air blasts, and the structure of collars 21 and openings 26 tend to deflect the air in more or less random directions which are generally downwardly through the housing 10. A cumulative result of the plurality of air jets 28 emitting simultaneous shock waves is a downwardly moving pressure wave which causes all of the bags to inwardly deflect approximately an inch over the axial length of the bag as the shock wave progresses. Subsequent shock waves may be generated to create additional bag vibration, and the frequency and duration of such blasts may be adjusted according to the particular needs of any given filtering situation. It has been observed that the generally turbulant air situation which exists inside of housing 10 during an air jet blast resembles a plurality of circular vibratory waves which commence at the top of the filter bags and progress downwardly to give the bags an oscillating motion. This motion shatters dust which may be caked along the interior bag surface and causes the dust to drop into chamber 15. The directional nature of the vibratory waves which pass downwardly over the exterior bag surfaces result in no significant net upward flow of air during this period of time, thereby eliminating any need for providing a blocking gate at the inlet 12 of the filter bag housing 10. Elimination of this gate results in further cost saving without reduction in efficiency of operation.

The present invention has worked effectively in filter bag housings having filter bags fifteen to eighteen feet in length, wherein a single air jet has effectively vibrated from eight to ten bags. In any particular application the parameters of air pressure, blast frequency, duration and orifice size may be adjusted to obtain an optimum bag cleaning result. The present invention may be embodied in other specific forms without departing from the spirit or essential attributes thereof, and it is therefore that the present embodiment be considered in all respects as illustrative and not restrictive, reference being made to the appended claims rather than to the foregoing description to indicate the scope of the invention.

What is claimed is:

1. In a filtration apparatus including a filter bag housing having a plurality of filter bags therein and an inlet chamber in communication with all of the bag interiors, and a dirt collection chamber in communication with the opposite end of the bag interiors, and a bag chamber in communication with an outlet and enclosing the bag exteriors, said apparatus comprising:
    a. an upper isolating wall between said inlet chamber and said bag chamber, said wall having a plurality of openings therethrough, each opening in alignment with a bag interior and having a supporting surface projecting into said bag interior;
    b. a lower isolating wall between said collection chamber and said bag chamber, said wall having a plurality of openings therethrough, each opening in sealable alignment with a bag interior;
    c. a collar surrounding each bag exterior adjacent one of said openings in the upper isolating wall, said collar having an axial length dimension of at least four inches; and
    d. a high pressure air pipe in said bag chamber and positioned proximate said upper isolating wall, said high pressure air pipe having therethrough a plurality of air jets, each air jet positioned intermediate adjacent collars and directed toward said collars to directionally couple high pressure air against said collars.

2. The apparatus of claim 1, wherein said bags are arranged in vertical rows and columns, and said air jets are positioned intermediate respective rows.

3. The apparatus of claim 2 wherein said upper isolating wall openings have supporting surfaces generally conical in shape, to create an undersurface having downwardly diverging circumferential surfaces adjacent each bag end.

4. The apparatus of claim 3, further comprising means for closing said outlet and thereby isolating said bag chamber from said outlet.

5. In a filtration apparatus including a filter bag housing having filter bags which are vertically supported at their respective top and bottom ends in said housing, said apparatus comprising:
    a. an inlet in said housing positioned above said bag top ends;
    b. a top cover plate attached inside said housing to form a first chamber above said bag top ends, said top cover plate having a plurality of downwardly directed conical openings therethrough;
    c. a plurality of circumferential collars, each collar supporting a filter bag top end around a respective top cover plate downwardly directed conical opening;
    d. a high pressure air pipe positioned beneath said top cover plate and extending proximate the center of said filter bags in said housing, said air pipe having air jet nozzles along its length and intermediate respective bags, said nozzles being directionally positioned toward adjacent circumferential collars;
    e. a bottom cover plate attached inside said housing to form a second chamber below said bag bottom ends and a third chamber between said top and bottom cover plates, said bottom cover plate having a plurality of openings therethrough and means for securing said filter bag bottom ends to said openings; and
    f. an outlet in said housing positioned in said third chamber.

6. The apparatus of claim 5 wherein said collars each have an axial length of at least 4 inches.

7. The apparatus of claim 6, wherein said bags are arranged in vertical rows, and said air jet nozzles are respectively positioned intermediate said rows.

* * * * *